(12) United States Patent
Andersen et al.

(10) Patent No.: US 10,291,762 B2
(45) Date of Patent: May 14, 2019

(54) DOCKING STATION FOR MOBILE COMPUTING DEVICES

(71) Applicant: CISCO TECHNOLOGY, INC., San Jose, CA (US)

(72) Inventors: Cathrine Werthwein Andersen, San Francisco, CA (US); David Bjerrum Reeckmann, San Francisco, CA (US); Christian Rasmussen, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 15/438,266

(22) Filed: Feb. 21, 2017

(65) Prior Publication Data

US 2017/0163788 A1    Jun. 8, 2017

Related U.S. Application Data

(63) Continuation-in-part of application No. 14/992,621, filed on Jan. 11, 2016, now Pat. No. 9,628,597.
(Continued)

(51) Int. Cl.
*H04M 1/725* (2006.01)
*H04L 29/08* (2006.01)
(Continued)

(52) U.S. Cl.
CPC ...... *H04M 1/72527* (2013.01); *G06F 1/1632* (2013.01); *H04L 67/306* (2013.01);
(Continued)

(58) Field of Classification Search
CPC .... H04M 1/72527; H04M 3/567; H04M 1/04; H04M 2250/62; G06F 1/1632;
(Continued)

(56) References Cited

U.S. PATENT DOCUMENTS 4,460,807 A    7/1984   Kerr et al.
4,890,257 A    12/1989  Anthias et al.
(Continued)

FOREIGN PATENT DOCUMENTS

CN    101055561    10/2007
CN    102572370    7/2012
(Continued)

OTHER PUBLICATIONS

Eichen, Elliot, et al., "Smartphone Docking Stations and Strongly Converged VoIP Clients for Fixed-Mobile Convergence," IEEE Wireless Communications and Networking Conference: Services, Applications and Business, 2012, pp. 3140-3144.
(Continued)

*Primary Examiner* — Pablo N Tran
(74) *Attorney, Agent, or Firm* — Polsinelli LLP

(57) ABSTRACT

A method for joining a mobile device to a meeting event begins with docking a mobile device in a docking station. The mobile device can be associated with a user profile, and is operable to receive a monitoring input. The mobile device detects a change in the monitoring input, and determines whether or not the change in the monitoring input corresponds with a docked state of the mobile device. Upon determining that the change in monitoring input did correspond with a docked state, a meeting application of the mobile device configures a docking mode of the mobile device. The meeting application connects to a meeting calendar that is associated with the user profile, and retrieves a desired meeting event from the meeting calendar. The meeting application then joins the desired meeting event.

20 Claims, 16 Drawing Sheets

Related U.S. Application Data

(60) Provisional application No. 62/263,083, filed on Dec. 4, 2015.

(51) Int. Cl.

| | | |
|---|---|---|
| *H04M 3/56* | (2006.01) | |
| *G06F 1/16* | (2006.01) | |
| *H04N 7/14* | (2006.01) | |
| *H04M 1/04* | (2006.01) | |

(52) U.S. Cl.
CPC ............ *H04M 3/567* (2013.01); *H04N 7/142* (2013.01); *H04M 1/04* (2013.01); *H04M 2250/62* (2013.01); *H04N 2007/145* (2013.01)

(58) Field of Classification Search
CPC .................. H04L 67/306; H04N 7/142; H04N 2007/145; H04R 3/12; H04R 29/001; H04R 2420/09; H04R 2499/11; H04R 2430/01

See application file for complete search history.

(56) References Cited

U.S. PATENT DOCUMENTS

| | | |
|---|---|---|
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,995,096 A | 11/1999 | Kitahara et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,463,473 B1 | 10/2002 | Gubbi |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,978,499 B2 | 12/2005 | Gallant et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,530,022 B2 | 5/2009 | Ben-Shachar et al. |
| 7,620,902 B2 | 11/2009 | Manion et al. |
| 7,634,533 B2 | 12/2009 | Rudolph et al. |
| 7,792,277 B2 | 9/2010 | Shaffer et al. |
| 7,881,450 B1 | 2/2011 | Gentle et al. |
| 7,920,160 B2 | 4/2011 | Tamaru et al. |
| 7,956,869 B1 | 6/2011 | Gilra |
| 8,059,557 B1 | 11/2011 | Sigg et al. |
| 8,081,205 B2 | 12/2011 | Baird et al. |
| 8,274,893 B2 | 9/2012 | Bansal et al. |
| 8,290,998 B2 | 10/2012 | Stienhans et al. |
| 8,340,268 B2 | 12/2012 | Knaz |
| 8,358,327 B2 | 1/2013 | Duddy |
| 8,428,234 B2 | 4/2013 | Knaz |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,630,208 B1 | 1/2014 | Kjeldaas |
| 8,638,354 B2 | 1/2014 | Leow et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,738,080 B2 | 5/2014 | Nhiayi |
| 8,831,505 B1 | 9/2014 | Seshadri |
| 8,860,774 B1 | 10/2014 | Sheeley et al. |
| 8,890,924 B2 | 11/2014 | Wu |
| 8,892,646 B2 | 11/2014 | Chaturvedi et al. |
| 8,924,862 B1 | 12/2014 | Luo |
| 8,930,840 B1 | 1/2015 | Riskó et al. |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,258,033 B2 | 2/2016 | Showering |
| 9,264,550 B2 * | 2/2016 | Kaye ...................... H04W 4/80 |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,398,250 B2 * | 7/2016 | Sobti ...................... H04N 7/142 |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,614,756 B2 | 4/2017 | Joshi |
| 9,667,799 B2 | 5/2017 | Olivier et al. |
| 9,762,709 B1 | 9/2017 | Snyder et al. |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0174826 A1 | 9/2003 | Hesse |
| 2003/0197739 A1 | 10/2003 | Bauer |
| 2003/0227423 A1 | 12/2003 | Arai et al. |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0267938 A1 | 12/2004 | Shoroff et al. |
| 2005/0014490 A1 | 1/2005 | Desai et al. |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0215229 A1 | 9/2005 | Cheng |
| 2006/0004911 A1 | 1/2006 | Becker et al. |
| 2006/0026255 A1 | 2/2006 | Malamud et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2007/0005752 A1 | 1/2007 | Chawla et al. |
| 2007/0041366 A1 | 2/2007 | Vugenfirer et al. |
| 2007/0091831 A1 | 4/2007 | Croy et al. |
| 2007/0100986 A1 | 5/2007 | Bagley et al. |

(56) References Cited

U.S. PATENT DOCUMENTS

| | | |
|---|---|---|
| 2007/0116225 A1 | 5/2007 | Zhao et al. |
| 2007/0139626 A1 | 6/2007 | Saleh et al. |
| 2007/0198637 A1 | 8/2007 | Deboy et al. |
| 2007/0250567 A1 | 10/2007 | Graham et al. |
| 2008/0068447 A1 | 3/2008 | Mattila et al. |
| 2008/0080532 A1 | 4/2008 | O'Sullivan et al. |
| 2008/0209452 A1 | 8/2008 | Ebert et al. |
| 2008/0278894 A1 | 11/2008 | Chen et al. |
| 2009/0012963 A1 | 1/2009 | Johnson et al. |
| 2009/0100142 A1 | 4/2009 | Stern et al. |
| 2009/0193327 A1 | 7/2009 | Roychoudhuri et al. |
| 2009/0254619 A1 | 10/2009 | Kho et al. |
| 2009/0256901 A1 | 10/2009 | Mauchly et al. |
| 2009/0292999 A1 | 11/2009 | LaBine et al. |
| 2009/0309846 A1 | 12/2009 | Trachtenberg et al. |
| 2010/0005142 A1 | 1/2010 | Xiao et al. |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0121959 A1 | 5/2010 | Lin et al. |
| 2010/0157978 A1 | 6/2010 | Robbins et al. |
| 2010/0183179 A1 | 7/2010 | Griffin, Jr. et al. |
| 2010/0211872 A1 | 8/2010 | Rolston et al. |
| 2010/0245535 A1 | 9/2010 | Mauchly |
| 2010/0250817 A1 | 9/2010 | Collopy et al. |
| 2010/0262925 A1 | 10/2010 | Liu et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0075830 A1 | 3/2011 | Dreher et al. |
| 2011/0131498 A1 | 6/2011 | Chao et al. |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0013704 A1 | 1/2012 | Sawayanagi et al. |
| 2012/0084714 A1 | 4/2012 | Sirpal et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0252669 A1 | 9/2013 | Nhiayi |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0108486 A1 | 4/2014 | Borzycki et al. |
| 2014/0157338 A1 | 6/2014 | Pearce |
| 2014/0161243 A1 | 6/2014 | Contreras et al. |
| 2014/0198175 A1 | 7/2014 | Shaffer et al. |
| 2014/0237371 A1 | 8/2014 | Klemm et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0317561 A1 | 10/2014 | Robinson et al. |
| 2014/0351327 A1 | 11/2014 | Huang et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0085060 A1 | 3/2015 | Fish et al. |
| 2015/0089393 A1 | 3/2015 | Zhang et al. |
| 2015/0089394 A1 | 3/2015 | Chen et al. |
| 2015/0112748 A1* | 4/2015 | Kaye .................. H04W 4/80 705/7.19 |
| 2015/0113050 A1 | 4/2015 | Stahl |
| 2015/0172120 A1 | 6/2015 | Dwarampudi et al. |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0373063 A1 | 12/2015 | Vashishtha et al. |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0104961 A1 | 4/2017 | Pan et al. |
| 2017/0324850 A1 | 11/2017 | Snyder et al. |
| 2017/0374187 A1* | 12/2017 | Chalabi .............. H04M 1/6041 |
| 2017/0374188 A1* | 12/2017 | Chalabi .............. H04B 1/3877 |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 959585 | 11/1999 |
| EP | 2341686 | 8/2016 |
| WO | WO 2012/167262 | 12/2012 |
| WO | WO 2014/118736 | 8/2014 |

OTHER PUBLICATIONS iGoiPhone, "AirCurve Acoustic Amplifier Now Available for iPhone 4," http://www.igoiphone.com/aircurve-acoustic-amplifier-now-available-for-iphone-4/; accessed Jan. 11, 2016.

Action Life Media, "mCAMLITE," http://www.actionlifemedia.com/mcamlite; accessed Jan. 11, 2016.

Author Unknown, "A Primer on the H.323 Series Standard," Version 2.0, available at http://www.packetizer.com/voip/h323/papers/primer/, retrieved on Dec. 20, 2006, 17 pages.

(56) References Cited

OTHER PUBLICATIONS

Author Unknown, ""I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com, 7 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.

Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.

Polycom, "Polycom UC Board, Transforming ordinary surfaces into virtual whiteboards" 2012, Polycom, Inc., San Jose, CA, http://www.uatg.com/pdf/polycom/polycom-uc-board-datasheet.pdf, (last accessed Oct. 11, 2013).

Stevenson, Nancy, "Webex Web Meetings for Dummies" 2005, Wiley Publishing Inc., Indianapolis, Indiana, USA, 339 pages.

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

Tno, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama—http://www.vidyo.com/products/vidyopanorama/ dated 2013. (last accessed Oct. 11, 2013).

\* cited by examiner

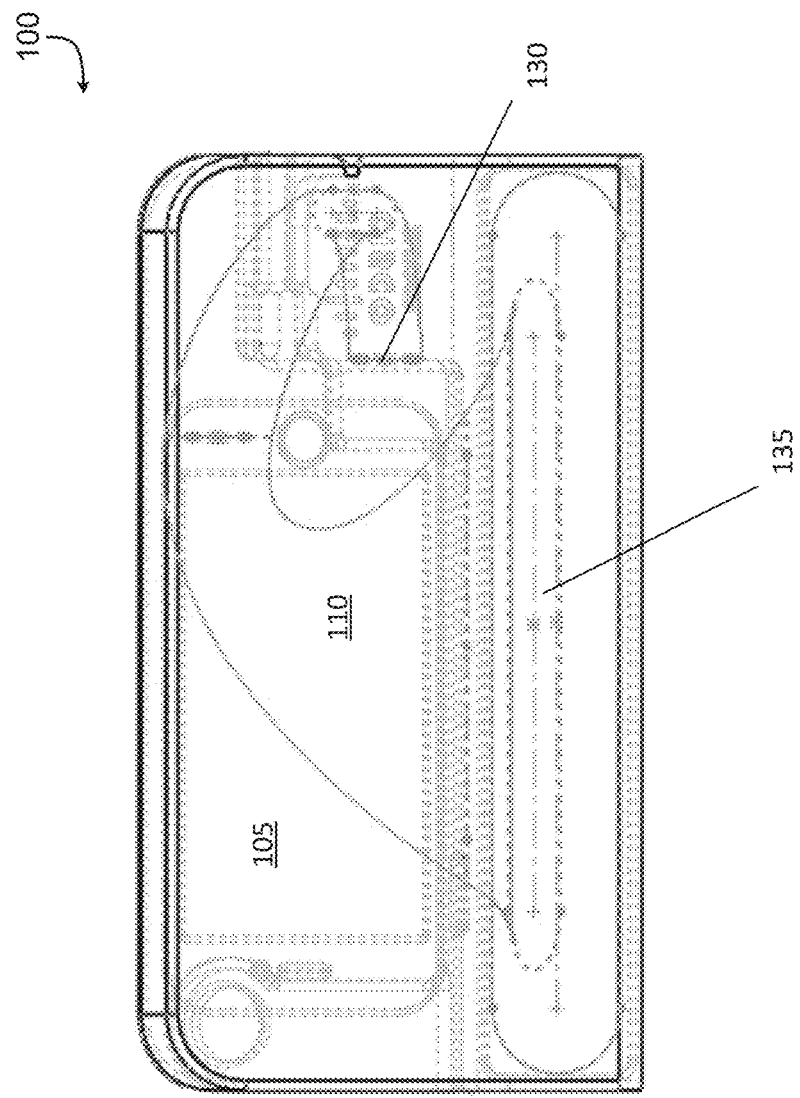

DOCKING STATION FOR MOBILE COMPUTING DEVICES

CROSS REFERENCE TO RELATED APPLICATIONS

This application is a continuation-in-part of U.S. application Ser. No. 14/992,621 titled "DOCKING STATION FOR MOBILE COMPUTING DEVICES", filed on Dec. 11, 2016, which claims the benefit of U.S. Provisional Application No. 62/263,083 titled "AUDIO AND VISUAL ENHANCEMENT DOCKING STATION FOR MOBILE COMPUTING DEVICES" filed on Dec. 4, 2015, which are both hereby expressly incorporated by reference in entirety.

TECHNICAL FIELD

The present technology relates in general to docking stations, and more specifically to a docking station to provide an automatic and enhanced teleconference experience.

BACKGROUND

Modern networked computing devices allow users to communicate with each other virtually via teleconferences. For example, many computing devices are equipped with a display, camera and microphone that enable users to capture and share sound and video with one another in real time. Teleconference specific computing devices that are designed with this functionality in mind provide a quality teleconference experience, but also come with a high price tag and are not well suited for other tasks. Common multi-purpose mobile computing devices can be used to for a teleconference, but are often not designed with this feature as the primary focus and therefore provide a lower overall experience. For example, mobile phones provide a relatively low sound volume and are equipped with a camera meant primarily to take pictures rather than facilitate a video conference. Accordingly, improvements are needed.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which:

FIG. 2 shows an example rear view of a docking station.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

The present technology includes docking a mobile computing device in a docking station and detecting a change in a monitoring input received by the mobile computing device. The change in the monitoring input corresponds to a docked state of the mobile computing device, and in response to determining the docked state of the mobile computing device, a meeting application of the mobile computing device can automatically: configure a docking mode of the mobile computing device, connect to a meeting calendar associated with the user profile, retrieve a desired meeting event, and join the desired meeting event.

In some embodiment the change in monitoring input can be detected by emitting a sound signal from at least one speaker of the mobile computing device, and receiving a return sound signal at one or more microphones of the mobile computing device. When the return sound signal matches an expected sound profile, or the time to receive the return sound signal is within an expected range, the mobile device can determine that it is docked and automatically perform one or more of the functions listed above.

DETAILED DESCRIPTION

Figure 1A:
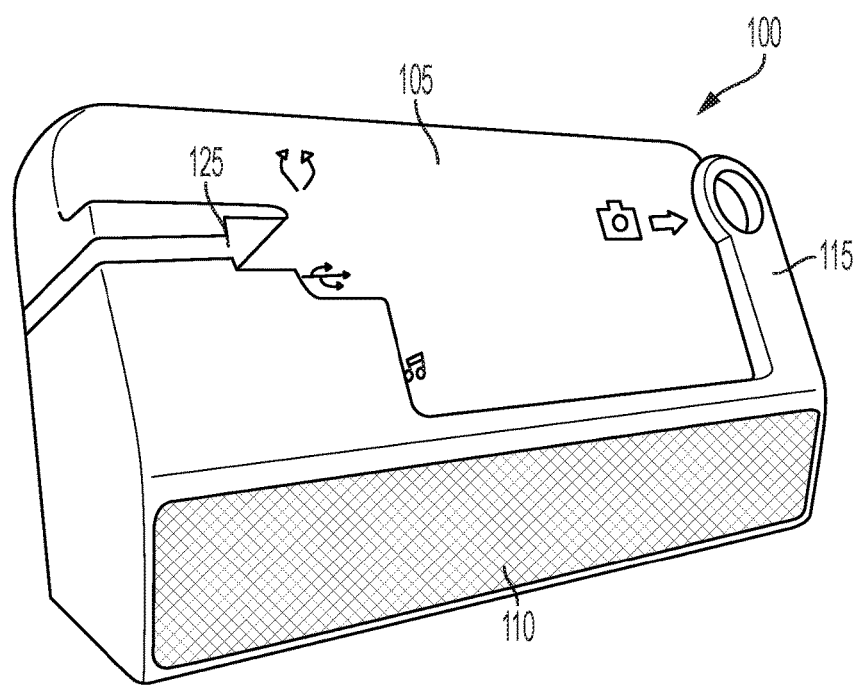
FIGS. 1A and 1B show examples of a docking station configured to provide an enhanced teleconference experience.
Figure 1B:
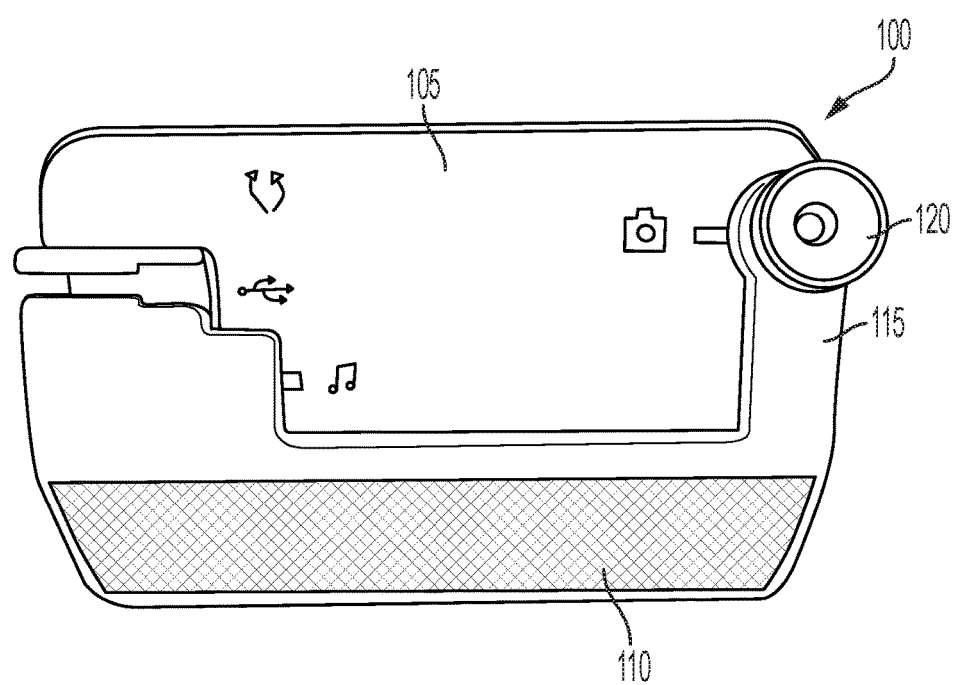

FIGS. 1A and 1B illustrate examples of a docking station 100 configured to provide an enhanced teleconference experience. As shown in FIG. 1A, a docking station 100 can include a body component 105 configured to receive a mobile computing device.

A mobile computing device can be any type of computing device designed to be mobile (e.g., not required to be physically connected to an external power source), such as a mobile smart phone, tablet PC, laptop, etc. For example, a mobile computing device can include some or all of the features, components, and peripherals of computing device 1100 of FIGS. 11A and 11B.

Receiving a mobile computing device can include affixing the mobile computing device to the docking station such that the mobile computing device will remain in a desired position. As used herein, the term 'docked' is used to signify that a mobile computing device has been inserted into a docking station. The body component 105 can include an opening and guides that are designed to receive the mobile computing device and hold the mobile computing device in a desired position with the display presented outward from the body component 105 to facilitate the teleconference.

The body component 105 can also include a base portion that supports the docking station 100 and keeps the docking station 100 in a desired configuration when set on a level surface. This can allow a user to dock, a mobile computing device to the docking station 100 and set the docking station 100 on a table or other surface to conduct a hands free teleconference.

The body component 105 can be configured to position the mobile computing device at an angle that is suited to conduct a teleconference. As shown, body component 105 is designed to hold a mobile computing device at an upward angle. This can allow a user to easily view the display of the mobile computing device while the docking station 100 is resting on a table and positioned lower than the user's head.

While the body component 105 shown in FIG. 1A is designed to receive and hold a mobile computing device in a single fixed position, in other embodiments, the body component 105 can be adjustable to allow a user reconfigure the docking station 105 to change the position of the mobile computing device in relation to the user. For example, the body component 105 can be adjustable to allow a user to tilt the body component 105 in relation to the base of the body component 105 to change the angle at which the display of the mobile computing device is presented while docked, to the docking station 100. This can allow a user to adjust the display of the mobile computing device based on the user's height and positioning while conducting a teleconference meeting.

The docking station 100 can include an acoustic audio enhancement horn 110 that is configured to enhance, amplify and/or otherwise alter audio that is output by a speaker of the mobile computing device during a teleconference. The acoustic audio enhancement horn 110 can be positioned and/or built within the body component 105. The acoustic audio enhancement horn 110 can include an internal opening positioned to align with the speaker of the mobile computing device when the mobile computing device is docked to the docking station 100. This can allow audio that is output by the speaker of the mobile computing device to enter the acoustic audio enhancement horn 110 through the internal opening.

The audio can then travel through the acoustic audio enhancement horn 110 and exit through an external opening of the acoustic audio enhancement horn 110. The external opening can be positioned on the outside of the body component 105 to provide the audio to the user. As shown, the external opening is positioned at the front of the body component 105 to provide audio directly to a user facing the docking station 100 during a teleconference.

The acoustic audio enhancement horn 110 can enhance and/or amplify the audio output by the mobile computing device during a teleconference. For example the acoustic audio enhancement horn 110 can increase in size from the internal opening to the external opening, thereby naturally amplifying the volume of the audio as it travels through the acoustic audio enhancement horn 110. Alternatively, the acoustic audio enhancement horn can simply redirect sound from the speaker in the direction of the user. In this type of scenario, the acoustic audio enhancement horn 110 may not amplify the sound, but rather just redirect it to make it easier for a user to hear during a teleconference.

The docking station 100 can also include a camera lens mounting element 115 that is coupled to the body component 105. As shown, the camera lens mounting element 115 is designed as a continuous piece with the body component 105. In some embodiments, however, the camera lens mounting element 115 can be a separate piece that has been affixed to the body component 105.

The camera lens mounting element 115 can be configured to receive an external camera lens. For example, the camera lens mounting element 115 can be designed to allow an external camera lens to snap, screw, or otherwise be affixed to the camera lens mounting element 115. The external camera lens can be any type of camera lens, such as a wide angle lens, zoom lens, etc., that is designed and/or appropriately sized to be affixed to the camera lens mounting element. FIG. 1B illustrates the docking station 100 with an external camera lens 120 attached to the camera lens mounting element 115.

Returning to the discussion of FIG. 1A, after the external camera lens is affixed to the camera lens mounting element 115, the camera lens mounting element 115 can hold the external camera lens in a position such that the external camera lens is aligned with a camera lens of the mobile computing device when the mobile computing device is docked to the docking station 100. This can allow the camera lens of the mobile computing device to capture image data through the external camera lens, thereby enhancing the video captured by the mobile computing device during a teleconference. For example, if the external lens is a wide angle lens, the image data captured by the camera lens of the mobile computing device through the external lens will also be wide angle, thereby providing the mobile computing device with a wider angle view than would be available with the camera lens of the mobile computing device alone.

As shown, the camera lens mounting element 115 is fixed to the body element 103 such that its position cannot be adjusted. Accordingly, in this type of embodiment, the docking station 100 is specifically design for mobile computing devices that are a specified size and/or have the camera placed in a specific location.

In some embodiments, however, the camera lens mounting element 115 can be adjustable to allow a user to change the position of the external camera lens and align the external camera lens with the camera lens of the mobile computing device. For example, the camera lens mounting element 115 can include or be affixed to the body component via slider that allows a user to adjust the position of the external camera lens. This can allow the docking station 100 to be used for mobile computing devices of various sizes and with cameras positioned at different places on the mobile computing device.

The camera lens mounting element 115 can be configured to receive multiple types of external camera lenses. This can allow a user to affix the appropriate external camera lens to the docking station 100 for the user's specified use and/or existing conditions. For example, the user can affix a zoom lens to capture distant images or provide a zoom. Alternatively, a user can use a wide angle lens to capture a group of people or when the user is near the lens.

The docking station 100 can further include an opening 125 through the body component 105 that can allow a power cord to be connected to a mobile computing device while the mobile computing device is docked to the docking station 100. For example, the opening 100 can be aligned with a power connector port of the mobile computing device, thereby allowing a user to plug a power cord into the mobile computing device to provide power while the user is conducting a teleconference meeting. It should be noted that the power cord would only provide power to the mobile computing device and that the docking station 100 itself does not require power to enhance the audio and video of the mobile computing device. Alternatively, in some embodiments, the docking station 100 can be designed to include a battery that can be used to power or charge a mobile computing device. In some embodiments, docking station 100 can be provided with a power coupling to receive power from an outlet. In such embodiments, docking station 100 can additionally be provided with an integral power connector port to transfer power to a mobile computing device that is docked to the docking station, wherein the power connector port can transfer power through direct electrical coupling or wirelessly.

In some embodiments, the docking station 100 can be designed to be portable or easily transported or carried by a user. For example, the docking station 100 can include a handle affixed to the body component 105 or made out of the body component 105 that allows a user to easily carry the docking station. Alternatively, in some embodiments, the docking station 100 can be designed to be disassembled into smaller pieces. For example, the body component 105 can be designed to be disassembled into two or more parts that are easier to carry. As another example, the camera lens mounting element 115 can be designed to be detached from the body component 105. Alternatively, the body component 105 can be designed to be folded or collapsed into a smaller size for travel.

FIG. 2 shows an example rear view of a docking station 100. As shown, an acoustic audio enhancement horn 110 can be built into a body component 105. The acoustic audio enhancement horn 110 can include an internal opening 130 and an external opening 135. The internal opening 130 can be positioned to align with a speaker of a mobile computing device when the mobile computing device is docked to the docking station 100. This can allow for sound output from the speaker of the mobile computing device to enter the acoustic audio enhancement horn 110 through the internal opening 130. As shown, the size of the acoustic audio enhancement horn 110 gets larger from the internal opening 130 to the external opening 135. This increase is size can naturally amplify the volume of sound travelling through the acoustic audio enhancement horn 110 from the internal opening 130 to external opening 135.

Figure 3:
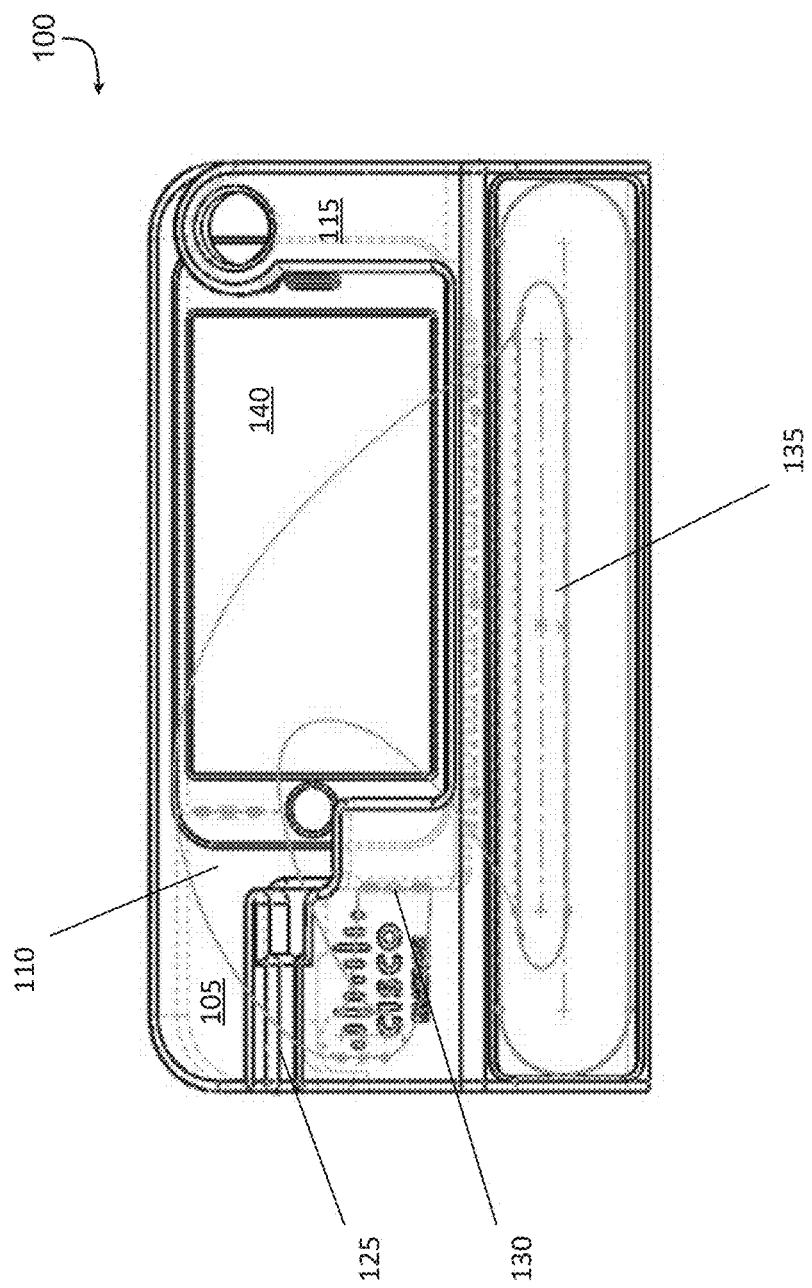
FIG. 3 shows an example front view of a docking station.

FIG. 3 shows an example front view of a docking station 110. The docking station 100 can be configured to receive a mobile computing device 140. For example the body component 105 of the docking station 100 can be designed to allow a mobile computing device 140 to be docked to the docking station 100. As shown, the docking station 100 can include a camera lens mounting element 115 that is positioned outside of the mobile computing device 140 when the mobile computing device is docked to the docking station 100. This can help also maintain the mobile computing device 140 in a desired position when the mobile computing device 140 is docked to the docking station 100.

The camera lens mounting element 115 can be configured to receive an external camera lens, which can be aligned with a camera lens of the mobile computing device 140. This can allow the camera lens of the mobile computing device 140 to capture video through the external camera lens.

As shown, an acoustic audio enhancement horn 110 can built into the body component 105. The docking station 100 can be designed such that when a mobile computing device 140 is docked to the docking station 100, a speaker of the mobile computing device 140 is aligned with an internal opening 130 of the docking station 100. This can allow sound output by the speaker to enter the acoustic audio enhancement horn 110, where it can be naturally magnified.

The docking station 100 can also include an opening 125 that allows a power cord to be connected to a mobile computing device 140 while the mobile computing device 140 is docked to the docking station. This can allow a user to power the mobile computing device 140 while conducting a teleconference.

Figure 4:
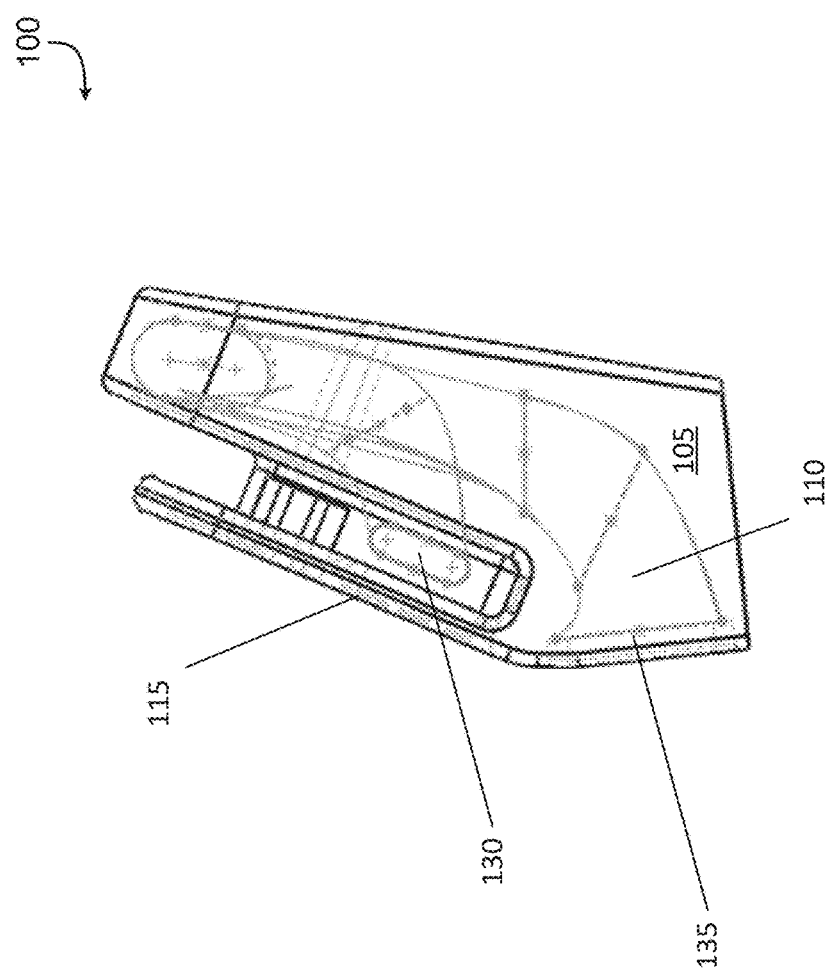
FIG. 4 shows an example right view of a docking station.

FIG. 4 shows an example right view of a docking station 100. As shown, an acoustic audio enhancement horn 110 can be built into a body component 105. The docking station 105 can include a camera lens mounting element 115 that can be used to dock a mobile computing device 140 to the body component 105 of the docking station. For example, as shown, the camera lens mounting element 115 can be positioned a distance away from the body component 105 to allow a mobile computing device to be positioned between the camera lens mounting element 115 and the body component 105.

An internal opening 130 of an acoustic audio enhancement horn 110 can be positioned to align with a speaker of a mobile computing device 140 when the mobile computing device 140 is docked to the docking station 100. This can allow sound output by the speaker to enter the acoustic audio enhancement horn 110, where it can be naturally magnified.

Figure 5:
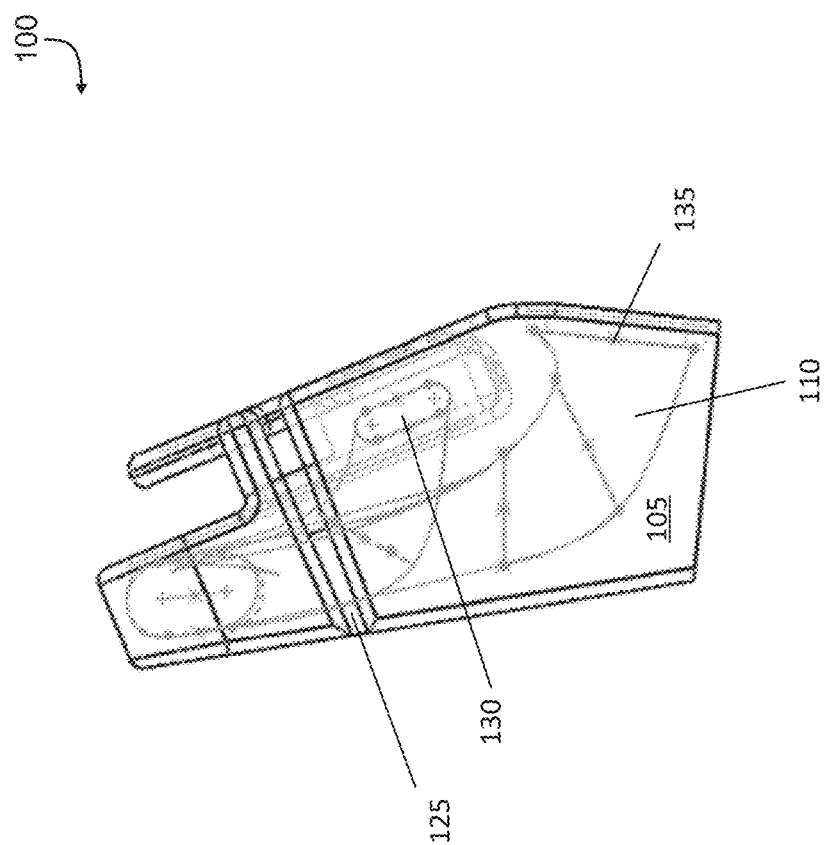
FIG. 5 shows an example left view of a docking station.

FIG. 5 shows an example left view of a docking station 100. As shown, an acoustic audio enhancement horn 110 can be built into a body component 105. The acoustic audio enhancement horn 110 can include an internal 140 when the mobile computing device 140 is docked to the docking station 100. This can allow sound output by the speaker to enter the acoustic audio enhancement horn 110, where it can be naturally magnified.

The docking station 100 can also include an opening 125 that allows a power cord to be connected to a mobile computing device 140 while the mobile computing device 140 is docked to the docking station 100. This can allow a user to power the mobile computing device 140 while conducting a teleconference.

Figure 6:
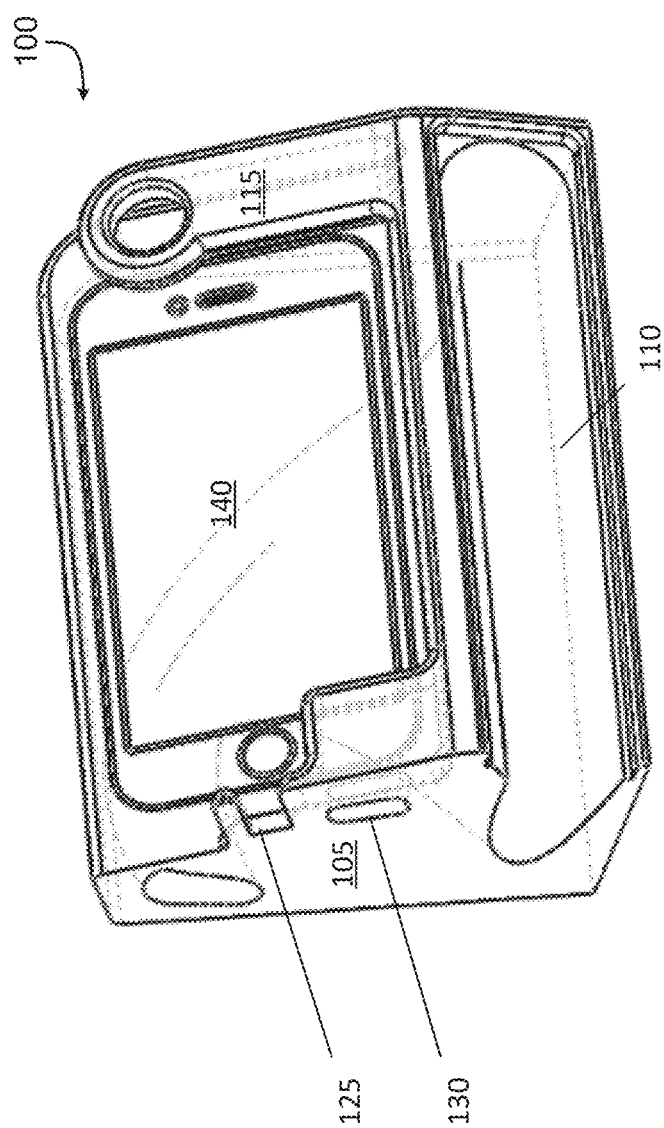
FIG. 6 shows an example cut view of a docking station.

FIG. 6 shows an example cut view of a docking station. As shown, an acoustic audio enhancement horn 110 can be built into a body component 105. The acoustic audio enhancement horn 110 can include an internal opening 130 that is positioned to align with a speaker of a mobile computing device when the mobile computing device is docked to the docking station 100. This can allow sound output by the speaker to enter the acoustic audio enhancement horn 110, where it can be naturally magnified.

As shown, the docking station 100 can include a camera lens mounting element 115 that is positioned a distance away from the body component 10t to allow a mobile computing device 140 to be docked to be placed between the camera lens mounting element 114 and the body component. This can help maintain the mobile computing device 140 in a desired position when the mobile computing device 140 is docked to the docking station 100.

The camera lens mounting element 115 can be configured to receive an external camera lens, which can be aligned with a camera lens of the mobile computing device 140. This can allow the camera of the mobile computing device to capture video through the external camera lens.

The docking station 100 can also include an opening 125 that allows a power cord to be connected to a mobile computing device 140 while the mobile computing device 140 is docked to the docking station. This can allow a user to power the mobile computing device 140 while conducting a teleconference.

Figure 7:
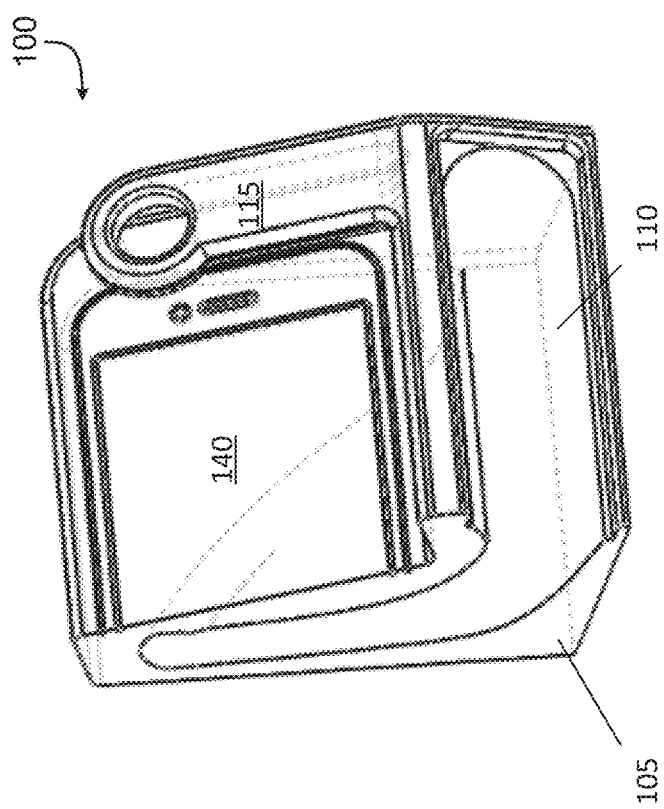
FIG. 7 shows another example cut view of a docking station.

FIG. 7 shows another example cut view of a docking station 100. As shown, an acoustic audio enhancement horn 110 can be built into a body component 105. The docking station 100 can include a camera lens mounting element 115 that is positioned a distance away from the body component 105 to allow a mobile computing device 140 to be docked to the docking station 100 between the camera lens mounting element 115 and the body component 105. This can maintain the mobile computing device 140 in a desired position while the mobile computing device 140 is docked to the docking station 100.

The camera lens mounting element 115 can be configured to receive an external camera lens, which can be aligned with a camera lens of the mobile computing device 140. This can allow the camera of the mobile computing device to capture video through an external camera lens.

Figure 8:
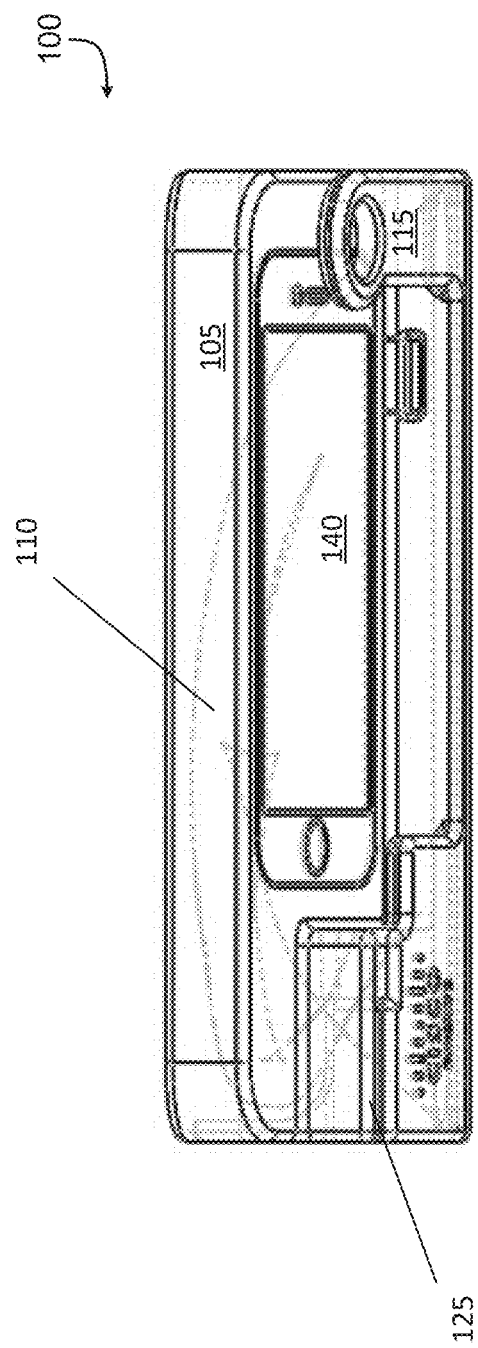
FIG. 8 shows an example top view of a docking station.

FIG. 8 shows an example top view of a docking station 100. As shown, an acoustic audio enhancement horn 110 can be built into a body component 105. The docking station 100 can include a camera lens mounting element 115 that is positioned a distance away from the body component 105 to allow a mobile computing device 140 to be docked to the docking station 100 between the camera lens mounting element 115 and the body component 105. This can maintain the mobile computing device 140 in a desired position while the mobile computing device 140 is docked to the docking station 100.

The camera lens mounting element 115 can be configured to receive an external camera lens, which can be aligned with a camera lens of the mobile computing device 140. This can allow the camera of the mobile computing device to capture video through the external camera lens.

The docking station 100 can also include an opening 125 that allows a power cord to be connected to a mobile computing device 140 while the mobile computing device 140 is docked to the docking station. This can allow a user to power the mobile computing device 140 while conducting a teleconference.

Figure 9:
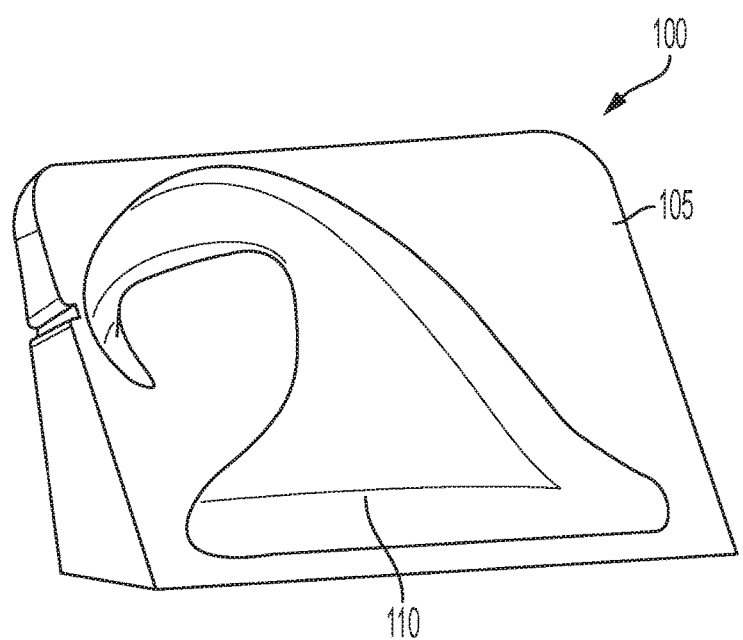
FIG. 9 shows another example cut view of a docking station.

FIG. 9 shows another example cut view of a docking station. As shown, an acoustic audio enhancement horn 110 is built into a body component 105. As shown, the size of the acoustic audio enhancement horn 110 can be designed to increase in size from an internal opening to an external opening to naturally amplify sound as it travels through the acoustic audio enhancement horn 110.

In some embodiments, the user's mobile computing device is able to determine when (and how) it is docked to a docking station.

Figure 10:
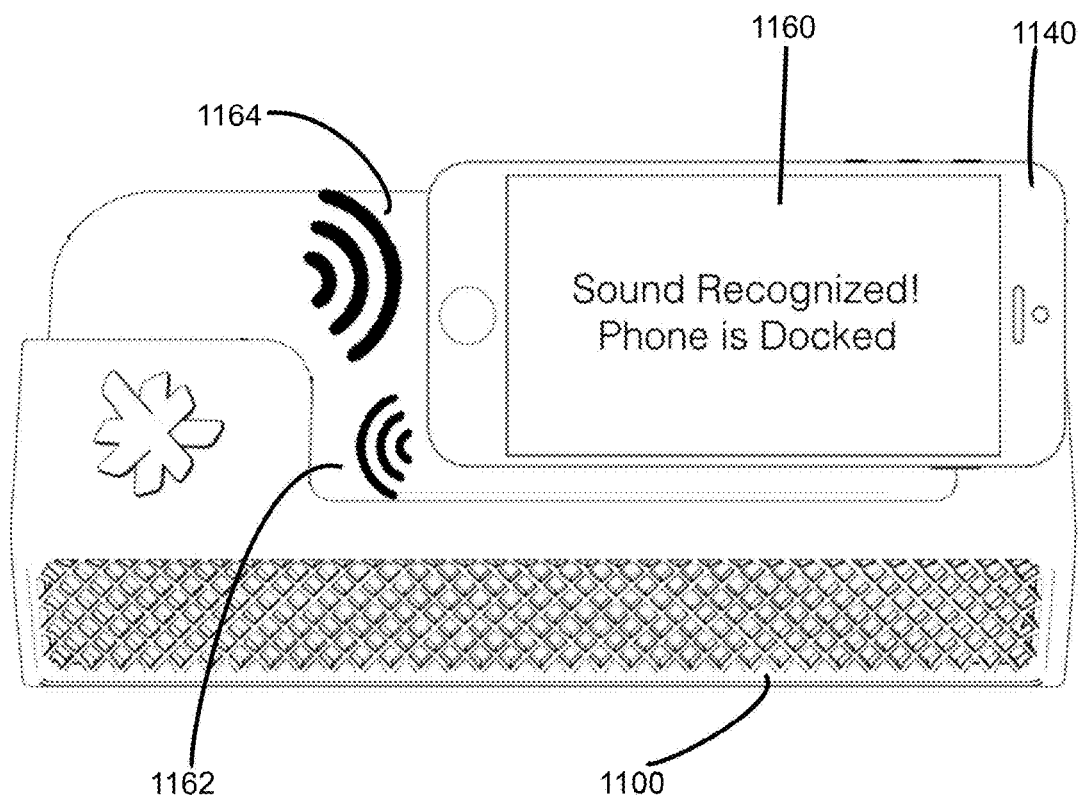
FIG. 10 shows an example embodiment of a docking station and mobile computing device.

FIG. 10 is a diagrammatic representation of an example front view of a user mobile computing device 1140 performing automated docking detection with a docking station 1100. As illustrated, mobile computing device 1140 is docked with docking station 1100, and can detect its status as docked.

Mobile computing device 1140 includes a meeting application 1160 that can be utilized to perform automated docking detection. In some embodiments, meeting application 1160 may be a mobile application for Cisco WebEx or Cisco Spark, although it is understood that other meeting applications may be employed without departing from the scope of the present disclosure. In addition to performing standard meeting application functions, meeting application 1160 is designed to sense and detect that mobile computing device 1140 has docked with a docking station by detecting changes in a monitoring input, e.g., a sound recorded at a microphone of mobile computing device 1140.

In some embodiments, meeting application 1160 can be designed to perform automated docking detection every time that it is launched. That is, every time that meeting application 1160 transitions to running in the foreground of mobile computing device 1140 (as opposed to running in the background, or hibernating), it can perform the docking detection process. In some embodiments, meeting application 1160 can be manually triggered to perform docking detection, for example through a user input on a touch screen of the mobile computing device 1140, or can be configured to perform docking detection in accordance with a pre-determined schedule.

Once triggered, docking detection begins with mobile computing device 1140 generating an interrogation sound signal 1162 with known or pre-determined properties. For example, the interrogation sound signal might be a 20 kHz half-second pulse, although other frequencies and durations may be employed without departing from the scope of the disclosure. It is noted that 20 kHz lies on the threshold between frequencies audible to the human ear, and the higher ultrasonic frequencies inaudible to the human ear. In some embodiments, it can be desirable to utilize ultrasonic frequencies in order to avoid disrupting or disturbing the user of the mobile computing device, or other nearby individuals. Infrasonic frequencies, which are too low to be audible to the human ear, may also be utilized, although in general, it may be easier for mobile computing device 1140 to generate ultrasonic frequencies rather than infrasonic frequencies.

Interrogation sound signal 1162 is then emitted by one or more speakers of mobile computing device 1140, such that it travels through the surrounding air as a pressure wave. Upon making contact with the housing of docking station 1100, the interrogation sound signal 1162 is reflected back towards mobile computing device 1140 as a return sound signal 1164. One or more microphones on mobile computing device 1140 can detect and record the return sound signal 1164, and pass the signal to meeting application 1160 for further analysis.

In general, interrogation sound signal 1162 will be altered in a predictable and repeatable manner upon making contact with the fixed shape presented by the housing of docking station 1100. That is, absent any mitigating external influences or sounds, the return sound signal 1164 will be a predictable transformation of the interrogation sound signal 1162, where the transformation is dependent upon the specific geometric characteristics of docking station 1100. For example, if interrogation sound signal 1162 is transmitted through an acoustic audio enhancement horn, such as the acoustic audio enhancement horn 110 of FIG. 9, then it will be modified (or enhanced) in a predictable manner. To further take advantage of this predictable modification, in some embodiments, interrogation sound signal 1162 may contain multiple frequencies, such that the return sound signal 1164 can be analyzed for certain frequencies that the acoustic audio enhancement horn is designed to either attenuate or amplify.

In some embodiments, meeting application 1160 may compare the return sound signal 1164 to a library of different known sound signatures, wherein each sound signature is specific to a certain interrogation sound signal 1162, a certain model of mobile computing device, and a certain model of docking station. This is due to the fact that speaker location varies from model to model with mobile computing devices, and the fact that geometric characteristics may vary from model to model of docking stations. If this library of known sound signatures is sufficiently large, meeting application 1160 may perform a probabilistic analysis to determine not only whether or not mobile computing device 1140 is in a docked state, but also the specific model of docking station 1110 to which the mobile computing device is docked.

In some embodiments, the return sound signal 1164 can be used to passively encode identifying information corresponding to docking station 1100. Such a feature takes advantage of the fact that the specific geometric characteristics of docking station 1100 will predictably modify the interrogation sound signal 1162 to generate a predictable return sound signal 1164. In this manner, different models of docking station 1100 can be designed to feature a different response to a given impulse or interrogation sound signal 1162. By providing meeting application 1160 access to these specific response characteristics for each model of docking station, it is possible to calculate the expected return sound signal that will be generated in response to any given interrogation sound signal if the mobile computing device 1140 is docked.

In some embodiments, meeting application 1160 may analyze the return sound signal 1164 without accessing any known sound signatures or responses. For example, a simplistic approach may be to measure the travel time of the return sound signal 1164. If return sound signal 1164 is received almost immediately after transmitting the interrogation sound signal 1162, the mobile computing device 1140 may be docked. If return sound signal 1164 is received after a substantial delay, or is never received at all, meeting application 1160 may conclude that mobile computing device 1140 is not docked. Other approaches may be employed as well, to allow meeting application 1160 to determine the docked state of the mobile device by analyzing a return audio signal to extract a change imposed upon an interrogation audio signal.

By utilizing an inaudible (ultrasonic or infrasonic) audio interrogation signal, the present disclosure enables a seamless and automatic detection of a docked state of mobile computing device 1140. From a user's perspective, the mobile computing device is simply placed in docking station 1100 and the desired meeting application 1160 is launched. By the time the meeting application has launched, the docking detection process has already completed, without disturbing the user. Unable to hear the interrogation sound signal 1162, the user notices that simply launching meeting application 1160 causes the mobile device to detect that it has been docked in a docking station.

In the opposite scenario, in which a user launches meeting application 1160 without docking the mobile computing device 1140, the experience carries on as normal. Although the interrogation sound signal 1162 will still be emitted, it can be designed to be inaudible, thereby leaving the user experience unchanged and uncompromised.

Although specific reference has been made above to monitoring the sound input of mobile computing device 1140, other detection methods and techniques may additionally be employed, separately or in combination, to determine a docked state of mobile computing device 1140.

For example, mobile computing device 1140 may be provided with one or more Hall effect sensors, which vary their output voltages in response to an applied magnetic field. In this example, triggering docking detection (e.g. through launching meeting application 1160) may cause meeting application 1160 to begin reading the output voltages from the Hall effect sensors, and look for any changes versus a baseline reading. In such an embodiment, it would be necessary to provide one or more magnets on the docking station 1100. The arrangement of these magnets can be used to encode identifying information corresponding to a specific docking station, or a specific model of docking station. As was the case with the interrogation audio signal 1162, the use of Hall effect sensors as a docking detection method is non-intrusive on the user experience.

Various other monitoring inputs may be analyzed by the meeting application 1160 in order to determine a docked state of mobile computing device 1140. For example, a camera sensor of mobile computing device 1140 can be used to read a QR code provided on the docking station such that the QR code and camera sensor are aligned when the mobile computing device is in a docked state (in some embodiments, the camera sensor can be provided by a rear facing camera of mobile computing device 1140, such that a front facing camera of the mobile device remains unobstructed for purposes such as capturing video). The QR code can additionally encode specific docking station identifying information. An RFID tag can be embedded in docking station 1100, such that docking detection comprises turning on an RFID reader in mobile computing device 1140 and delivering the output of the RFID reader to the meeting application 1160. The RFID tag can be passive (energized by the radio waves from the mobile computing devices RFID reader) or active (energized by an electricity source in the docking station). The RFID tag may also be an NFC tag. As was the case with QR codes, RFID and NFC tags can likewise be used to encode specific docking station identifying information.

In further embodiments, a brightness reading from the camera can be combined with an accelerometer and/or gyroscopic reading, from sensors internal to mobile computing device 1140. For example, when meeting application 1160 is launched, it can check to see if the camera is reading zero to no light (as would be the case when the mobile computing device is docked and the camera sensor is blocked), if the accelerometer indicates that mobile computing device 1140 is stationary, and if the gyroscope indicates that a display of mobile computing device 1140 is oriented roughly perpendicular to the ground. In embodiments wherein docking station 1100 can provide electrical power to mobile computing device 1140, the binary yes/no charging state of the mobile computing device can be used as an additional test of whether or not docking has occurred. In some embodiments, a charging connector can identify that the device is docked within a docking station.

In accordance with any of the techniques described above, taken alone or in combination, upon docking detection being triggered, meeting application 1160 can effectively determine whether or not mobile computing device 1140 is docked, and in some embodiments, can further determine identifying information corresponding to docking station 1100.

In embodiments wherein the mobile device 1140 can determine identifying information corresponding to docking station 1100, the docking station identifying information can be used to determine attributes about the docking station, or attributes of the environment surrounding the docking station. For example, some docking stations may have different horn configurations, and accordingly, mobile device 1140 might modify the sound of its output to achieve the best quality sound from the docking station. Some docking stations might be located in known environments with corresponding known acoustic characteristics and requirements, such as a conference room with a monitor and a phone, a telepresence room with telepresence system, or on a desk with computer nearby. In some embodiments, mobile computing device 1140 can detect the docking station identifying information using an application. The application can send the docking station identifying information to a server to learn attributes of the docking station, and the application of the mobile computing device can automatically put itself in a proper display or functioning mode, and automatically connect or set up other devices in the environment of the docking station.

Figure 11:
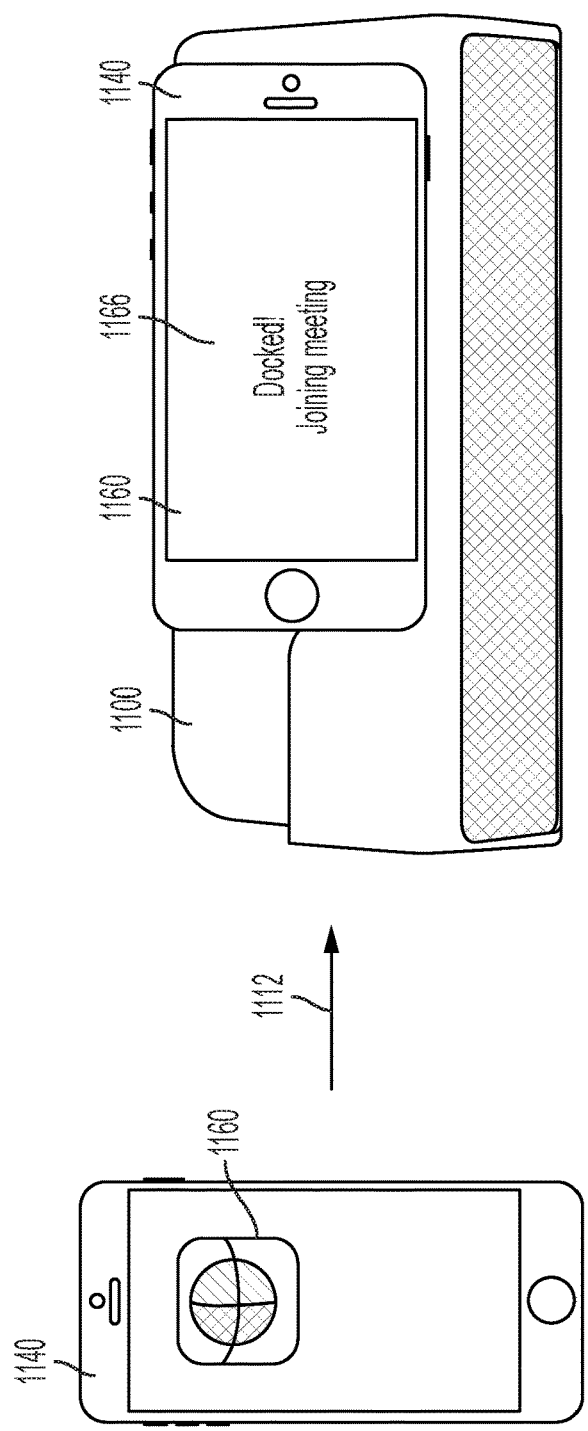
FIG. 11 shows an example embodiment of a mobile computing device docked with a docking station.

FIG. 11 illustrates an exemplary embodiment in which a user begins with mobile computing device 1140 in an undocked state, and with meeting application 1160 launched and running. As mentioned above, meeting application 1160 can be designed to perform docking detection upon being first launched. In this case, meeting application 1160 determined that the mobile computing device was not docked. In some embodiments, meeting application 1160 will periodically re-perform docking detection as long as it is running. In some embodiments, meeting application 1160 will continuously perform docking detection as long as it is running.

With meeting application 1160 still running, FIG. 11 illustrates (via arrow 1112) that mobile computing device 1140 is then docked with docking station 1100. In accordance with the previously described methods, meeting application 1160 performs docking detection and ascertains that mobile computing device 1140 is now docked. In some embodiments, a confirmation 1166 can be displayed on a screen of mobile computing device 1140.

Once meeting application 1160 has ascertained the docked state of mobile computing device 1140, it can be desirable for the meeting application to automatically configure a docking mode of the mobile computing device. For example, a simple docking mode might operate to optimize various settings of the mobile computing device 1140 in order to improve the user experience. Such optimizations include modifying the sound output settings or sound profile applied to the speakers of mobile computing device 1140 in order to better adapt the speakers for sound transmission through an acoustic audio enhancement horn. In some embodiments, these audio output optimizations can be performed in light of the previously obtained specific identifying information corresponding to the docking station 1100, such that the speakers are optimized for the particular audio horn characteristics of that given docking station model. Optimizations may also include placing mobile computing device 1140 into a "do not disturb mode", where incoming communications are blocked, or into a more permissive silent mode wherein incoming notifications are not allowed to play a noise, vibrate the mobile computing device, or overlay a visual element on the display of the mobile computing device. Docking mode optimizations may also include automatically placing the display of mobile computing device 1140 into the horizontal orientation seen in FIG. 11, or even locking the display into a horizontal orientation in order to prevent any accidental or unintended rotations of the displayed content. Screen brightness can be adjusted, particularly in instances where the mobile computing device 1140 is connected to electrical power via docking station 1100, in order to provide greater clarity during a video conference or other meeting event. Fonts and icons may be modified for an optimal meeting configuration, i.e. increasing size and switching to a sans-serif font. Certain applications or hands-free features associated with the docking mode can be automatically launched. For example, it might be desirable to automatically launch a voice recorder application and a note taking application when upon detecting docking, as these two functionalities are commonly associated with meeting events. Various other docking mode optimizations can be implemented without departing from the scope of the present disclosure, and the docking mode may be pre-defined by the user or may be linked to a specific user profile currently associated with mobile computing device 1140.

For example, in the particular example illustrated in FIG. 11, mobile computing device 1140 begins on the left in an undocked state, with meeting application 1160 open and displayed in a vertical configuration. Although meeting application 1160 can perform docking detection at this time, it determines that the mobile computing device is not docked, and as such, does not configure a docking mode. However, once mobile computing device 1140 is docked in docking station 1100, as indicated by arrow 1112, meeting application 1160 will detect a docked state and configure a docking mode of mobile computing device 1140. In this particular case, the docking mode causes the screen orientation of the mobile computing device to switch from vertical to horizontal. Although not visible in FIG. 11, this docking mode can also include increased screen brightness and disabling incoming notifications such that the meeting being joined by meeting application 1160 is not disturbed. The confirmation 1166 can also be included in the docking mode of mobile computing device 1140, such that the confirmation is displayed to allow a user to ascertain that docking mode is now configured, or being configured. Configuring mobile computing device 1140 into a docking mode can also include activating one or more of a front facing camera and a microphone, for capturing audiovisual data for a meeting event. Additionally, as pictured, docking station 1100 can include an acoustic audio enhancement horn, and the speaker of mobile computing device 1140 can be adjusted to best suit the acoustic characteristics of the particularly horn found in docking station 1100.

Meeting application 1160 can be configured to seamlessly and automatically interface with a meeting calendar associated with a user profile on mobile computing device 1140, in order to locate, retrieve, and join an ongoing or upcoming meeting event from the user's meeting calendar, as indicated in FIG. 11. Joining a meeting event is understood to consist of one or more of establishing internet or intranet based audiovisual communication, establishing text-based messaging, and establishing voice based communication over a telephony network. If there is an ongoing meeting event, then it can be desirable for meeting application 1160 to immediately join the ongoing meeting event without prompting for user confirmation. In the case of an upcoming meeting event, meeting application 1160 can be configured to locate, retrieve, and prepare to join the meeting event, but ultimately request user confirmation before joining the meeting event. A pre-defined threshold can be associated with the user profile, such that any meeting events starting within a set amount of time will be automatically joined, and any meeting events starting after the set amount of time will require confirmation before joining.

Camera settings for mobile computing device 1140 can also be adjusted, to increase contrast or brightness of the video being captured. In some embodiments, docking station 1100 can be provided with an internal system of mirrors, such that the rear-facing camera of mobile computing device 1140 can be used to capture a user's image instead of the front-facing camera. In accordance with the previously obtained identifying information corresponding to docking station 1100, meeting application 1160 can optimize the camera settings for a given meeting event to select the appropriate one of the rear-facing or front-facing camera for docking station 1100.

The meeting calendar can be provided on a remote meeting server (not illustrated), can be stored locally on mobile computing device 1140, or can be integrated as a portion of meeting application 1160. The same meeting server can be used to receive various usage metrics corresponding to a given use of docking station 1100 by a mobile computing device, or to receive an indication that the given docking station 1100 is currently in use and therefore unavailable to others.

Regardless of how meeting application 1160 retrieves the meeting calendar associated with the user's profile, the disclosed techniques serve to enhance the user experience. For example, a user may be running late to a teleconference. He enters the conference room, and launches a selected meeting application on his mobile computing device. The meeting application then immediately, but imperceptibly, begins to monitor for an indication that the mobile device has been docked. Meanwhile, the user places his mobile device into a docking station. The meeting application analyzes the received monitoring input(s) and determines that the mobile device has been docked. Simultaneously, the meeting application also analyzes the receiver monitoring input(s) and determines that the mobile device has been docked into docking station model B3, a miniature model that benefits from receiving bass boosted audio. The meeting application adjusts the audio output settings of the mobile device, increases the screen brightness, disables incoming notifications, and forces horizontal mode. Then, the meeting application retrieves the user's meeting calendar, and locates the current meeting. Because the meeting is ongoing, the meeting application automatically joins the meeting, receiving and transmitting the associated audiovisual data.

From the perspective of the user, he simply enters the conference room, opens his meeting application, and places his mobile device in the dock. He is then automatically connected to his current meeting, and presented with a brightened display and bass enhanced audio, all without being required to take any action on his part.

Figure 12:
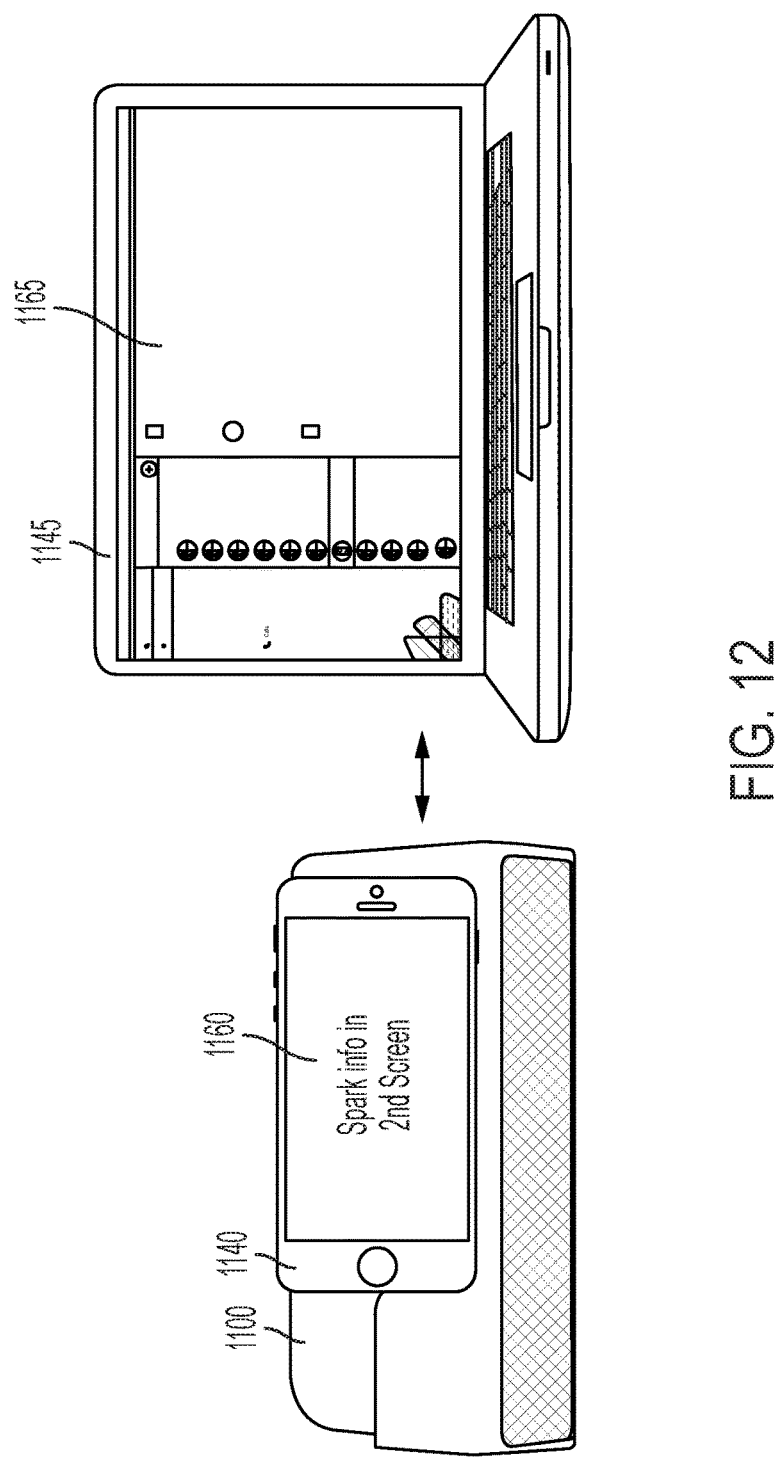
FIG. 12 shows an example embodiment of a mobile computing device being used with a docking station as a second screen device.

FIG. 12 depicts an embodiment in which mobile computing device 1140 is configured as a second screen device for the meeting event, as opposed to the previously described embodiments in which mobile computing device 1140 was the primary screen device for the meeting event. Mobile computing device 1140 is docked with docking station 1100, as described above, although its docking mode is now associated with a second screen functionality rather than a primary screen functionality. The docking mode associated with FIG. 12 still configures mobile computing device 1140 to orient its display in a horizontal orientation, but, due to the nature of second screen functionality, may not include any configuration of a front facing camera or speaker of mobile computing device 1140, based on the lower probability that either will be required. Of course, if the user does require or desire the functionality provided by either of these two components, they can be selected and activated manually, or included in a user specified setting for the docking mode that configures a second screen configuration of the mobile computing device 1140. This second screen configuration can be triggered in several ways, as explained below.

The first is based on an analysis of user's meeting calendar, and more particularly, and analysis of the type of meeting event. For example, some meeting events may be teleconferences, requiring audiovisual communication. Other meeting events may be more akin to group chats, wherein text-based messages, images, and files are exchanged. A Cisco Spark Room is one such example of a meeting event that does not require, but can have, audiovisual communication. In such a scenario, a user typically participates in the meeting event from a primary computing device 1145, such as a laptop or desktop computer. The primary computing device 1145 joins the text-based meeting event through a primary meeting interface 1165, where messages are composed and displayed. In this embodiment, mobile computing device 1140, upon determining that the current meeting event is a text-based meeting event, configures itself as a second screen device, displaying additional or complementary information to the information displayed on primary computing device 1165. For example, while mobile computing device 1140 functions as second screen device, the meeting application 1160 can retrieve and display a listing of participants, and a status for each participant (e.g. active, away, busy, offline, etc.)

In a second technique, meeting application 1160 can be configured to, upon docking, check to see if the user profile is currently associated with any unscheduled meeting events or group chats. This can be particularly helpful, given that these text-based meeting events often occur spontaneously, without being entered into the user's meeting calendar. If meeting application 1160 detects an unscheduled meeting event or group chat, meeting application 1160 can automatically join as a second screen device, or can prompt the user for confirmation before joining as a second screen device.

The described second screen functionality is not limited to displaying a listing of participants and their respective statuses. The second screen functionality can additionally include displaying files shared into the meeting event; displaying a listing of all other meeting events, text-based meeting events, or group chats; displaying a calendar of upcoming events; displaying a clock or timer; and functioning as a camera for sharing audiovisual data to the meeting event. The described second screen functionality is not limited to the above listing, and includes various other functionalities known and appreciated in the art.

In some embodiments, mobile computing device 1140 and primary computing device 1145 may communicate directly, using communication means such as Bluetooth or WiFi Direct. In some cases, mobile computing device 1140 and primary computing device 1145 may communicate indirectly, through an intermediate server, or through the cloud. When a meeting event is ongoing, primary computing device 1145 may advertise, over a selected communication channel, the occurrence of the event. This is particularly helpful in the case of a spontaneous or otherwise unscheduled meeting event. As such, meeting application 1160 of mobile computing device 1140 can scan for any such broadcasts once it is docked, in some cases performing such a scan after determining that there are no desired meeting events present in the user's meeting calendar. Upon detecting a broadcast of an ongoing meeting at the primary computing device 1145, meeting application 1160 can automatically join the ongoing meeting as a second screen device, or in accordance with any other parameters desired by the users. In some instances, the broadcast may trigger meeting application 1160 to launch a second meeting application, different from meeting application 1160, which more closely corresponds to or is better able to service the ongoing meeting event.

Figure 13:
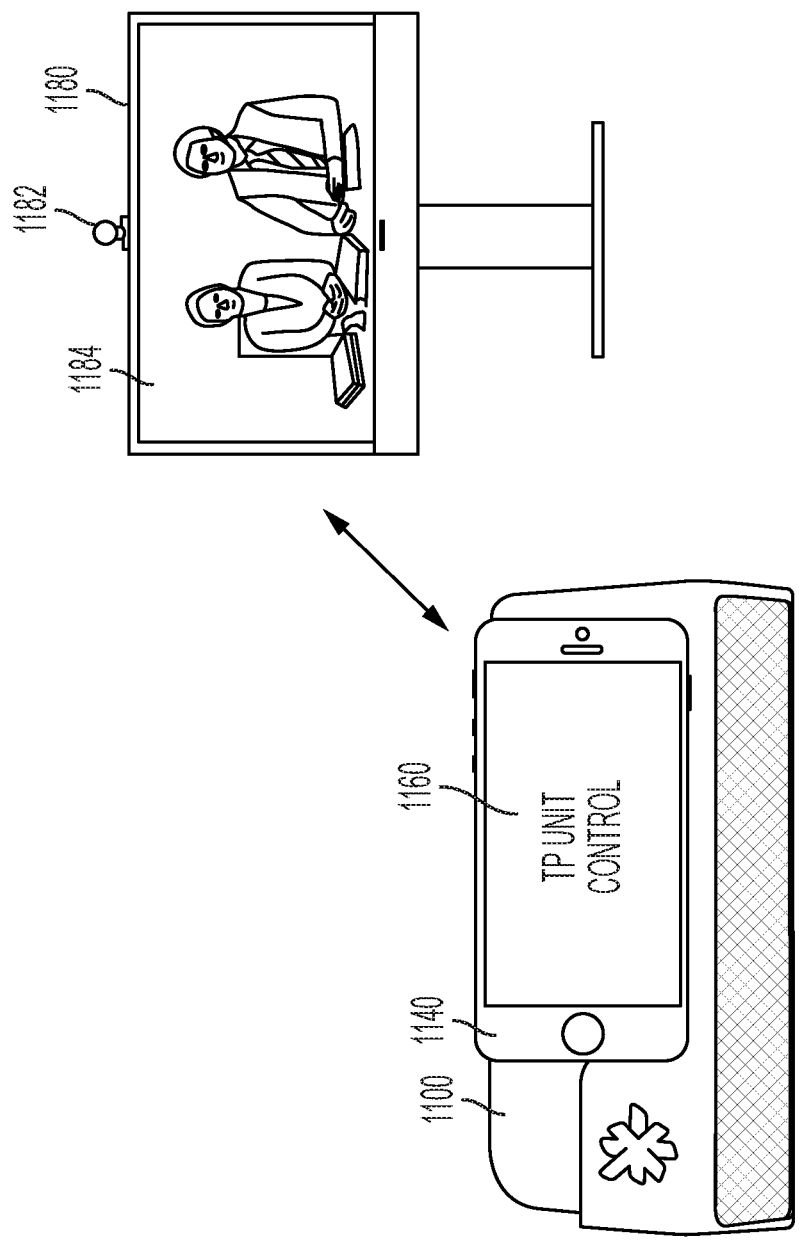
FIG. 13 shows an example embodiment of a mobile computing device being used with a docking station as a second screen device.

FIG. 13 presents an additional embodiment in which mobile computing device 1140 is used as a remote control second screen device. More particularly, FIG. 13 illustrates a context in which mobile computing device 1140 is used as a remote control second screen device for a telepresence unit 1180, which, as illustrated, consists of a camera 1182 and a television screen running a telepresence application 1184. Various other telepresence units can be utilized without departing from the scope of the present disclosure, as can television sets in general, wherein mobile computing device 1140 is used as a remote control for content shown on the display of a television.

Upon detecting a docked state, mobile computing device 1140 can be configured in a docking mode corresponding to remote control second screen device functionality. While this can include features such as forcing a horizontal screen orientation and disabling incoming notifications, the remote control second screen docking mode also can include performing an automatic connection or synchronization process to communicatively couple mobile computing device 1140 to the object or system that is to be remotely controlled, here the telepresence unit 1180. In some embodiments, the docking mode might cause mobile computing device 1140 to scan its environment for any available devices for remote control, and upon detection, cause mobile computing device 1140 to either automatically attempt connection or present a listing of available devices to the user for selection. In either manner, the process of initializing and configuring a connection to permit the desired remote control is automated and seamlessly presented to a user of mobile computing device 1140 and methods of the present disclosure.

Returning to the specific example of FIG. 13, meeting application 1160, upon docking, detects the presence of the telepresence unit 1180. In some embodiments, telepresence unit 1180 may be uniquely associated with docking station 1100, such that the identifying information corresponding with docking station 1100 is also indicative of the presence of telepresence unit 1180. Telepresence unit 1180 may also be associated with the meeting event retrieved from the user's meeting calendar, such that meeting application 1160 learns of the presence of telepresence unit 1180 only upon retrieving the desired meeting event. In some cases, telepresence unit 1180 can be configured to wirelessly broadcast its presence, using, for example, Bluetooth or WiFi, allowing meeting application 1160 to detect telepresence unit 1180 even if it is not docked with docking station 1100. In some embodiments, telepresence unit 1180 may utilize Bluetooth communication only, in which case meeting application 1160 can be triggered to activate Bluetooth on mobile computing device 1140 as part of configuring the docking mode or as part of joining the meeting event.

Once telepresence unit 1180 has been detected and connected to, meeting application 1160 can present a remote control second screen interface. In the context of telepresence unit 1180, this remote control second screen interface can be used to, for example, control camera 1182, to perform functions such as zooming, panning, tilting, muting, and powering off and on. In more generic embodiments, a remote control second screen interface can be used to control playback or streaming of audiovisual content on an external display, such as the television screen of telepresence unit 1180.

Figure 14:
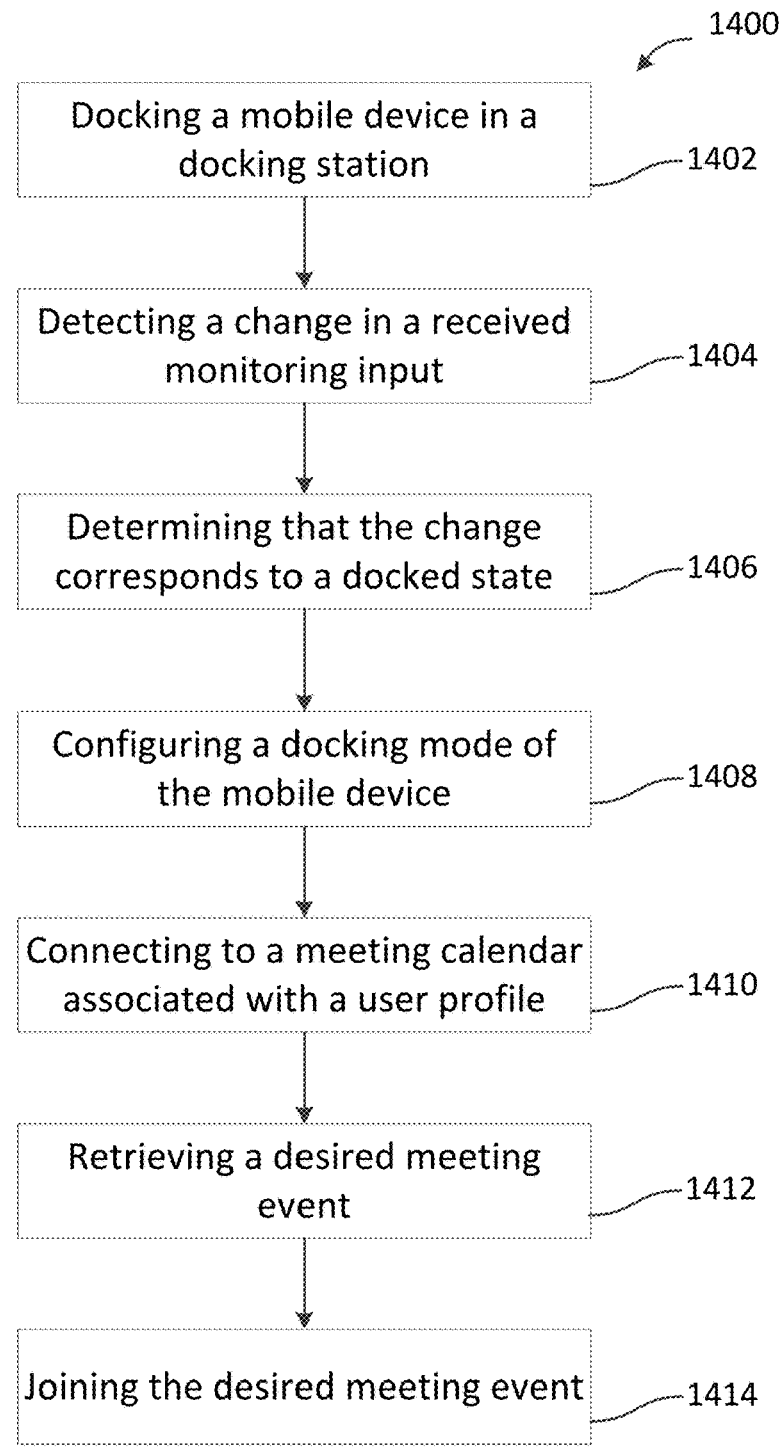
FIG. 14 is a flowchart depicting an example method of the present disclosure.

FIG. 14 depicts a flowchart 1400 of an exemplary method of the present disclosure. The method begins with a step 1402, in which a mobile computing device is docked with a docking station.

After being docked, in a step 1404, the mobile computing device detects a change in a received monitoring input. In some embodiments, a meeting application running on the mobile computing device receives the monitoring input and is effective to detect the change. The monitoring inputs can include audio signals, camera signals, readings from Hall effect sensors, accelerometers, gyroscopes, light intensity sensors, and a charging state of the mobile computing device, although this listing of examples is not limiting. In some embodiments, the change is compared to a baseline state—that is, the detecting comprises looking for any variation from the baseline.

Once a change in a monitoring input is detected, in a step 1406, the change is analyzed to determine whether or not it is indicative of a docked state of the mobile computing device. This analysis can be based upon a comparison of the detected change to expected changes if the mobile computing device is docked, wherein the expected changes can be stored locally on the mobile computing device, on a remote server, or some combination of the two. Similarly, the overall process of analyzing the detected change can be performed on the mobile computing device, on the remote server, or some combination of the two. For example, in some instances, the mobile computing device may perform some pre-processing and data conditioning before transmitting the pre-processed data to the remote server for further analysis and determination of a docked state. In other cases, the mobile computing device may be equipped to substantially perform the entire analysis and processing on its own, relying only upon the remote server for more complex analyses which it is unable to expeditiously perform on its own. In some embodiments, this analysis is probabilistic, and is based on two or more changes in corresponding monitoring inputs. In some instances, the mobile computing device can be used to analyze a first change in a monitoring input while the remote server can be used to analyze a second change in a monitoring input, such that in general, the remote server and mobile computing device operate in parallel to process and analyze changes in two or more monitoring inputs.

Upon determining that the mobile computing device is docked, in a step 1408, the mobile computing device is configured to be in a docking mode. In some embodiments, the docking mode itself is based upon information determined in the analysis step of 1406. For example, detecting the docked state can include detecting specific information corresponding to the docked state, such as if the docking station requires a horizontal or vertical screen configuration, if the docking station contains an acoustic audio horn, if the docking station is coupled to an external device for remote control, and other possibilities discussed above. As such, the step of configuring a docking mode can include first determining characteristics of the specific docking mode that are desired or required. In some instances, a user may input one or more parameters to configure the docking mode, either in real-time or ahead of time, such that the user preferences are pre-determined. In some cases the configuring is done automatically, and in some cases the configuring may require user approval or confirmation. The docking mode can include adjustments to the settings of the mobile computing device, such as entering a horizontal display mode, increasing screen brightness, launching a specified application, entering a silent or do not disturb node, turning on Bluetooth and/or WiFi, and adjusting the audio output settings of the mobile computing device. Other adjustments are contemplated, and the above listing is not presented as limiting.

With the docking mode configured, the method then proceeds to a next step 1410, wherein the meeting application of the mobile computing device connects to a meeting calendar, the meeting calendar being associated with a user profile of the user of the mobile computing device. The meeting calendar may contain one or more upcoming or ongoing meeting events in which it is desirable to connect and use the mobile computing device as either a primary screen or secondary screen device. In some embodiments, the meeting calendar may be automatically retrieved, and in others, the user may be prompted to select a calendar to retrieve. The meeting calendar and the meeting application may be integrated in some cases.

The method then proceeds to a step 1412, which selects and retrieves a desired meeting event. In some instances, the desired meeting event is retrieved directly from the user's meeting calendar, in which case the desired meeting event can be an ongoing event or an upcoming event that meets certain pre-defined criteria, such as an imminent start time. In other cases, the desired meeting event may not be retrieved from the meeting calendar, or no meeting events that meet the pre-defined criteria may be present in the meeting calendar, in which case the meeting application may scan for broadcasts indicative of ongoing meeting events that were unscheduled. The broadcasts can be passive or active, and can indicate the room the docking station is located in or provide information from a meeting application such as Cisco WebEx or Cisco Spark. In some embodiments, the broadcasts can be responsive to a query received from a mobile computing device, which can also include mobile computing devices other than the one corresponding to the single given user. In other examples, a broadcast might be received from telepresence equipment either associated with the docking station or in close proximity, the broadcast indicative of the fact that a meeting event making use of the telepresence equipment is currently ongoing or scheduled to start shortly. In this case, the meeting application can then request to join the meeting event, or could receive meeting joining information automatically, as a part of the broadcast or as a separate step and communicative transmission. The step concludes with a desired meeting event being selected, whether the desired meeting event was scheduled (and from the meeting calendar) or not.

In a final step 1414, the meeting application then joins the desired meeting event selected in the previous step. In some cases, the meeting application may join the desired meeting event in accordance with certain criteria that were predetermined by the user, or recently input by the user. The meeting application can then cause the mobile computing device to proceed with meeting participation, as a primary screen device, a secondary screen device, or both, as would otherwise be expected.

Figure 15B:
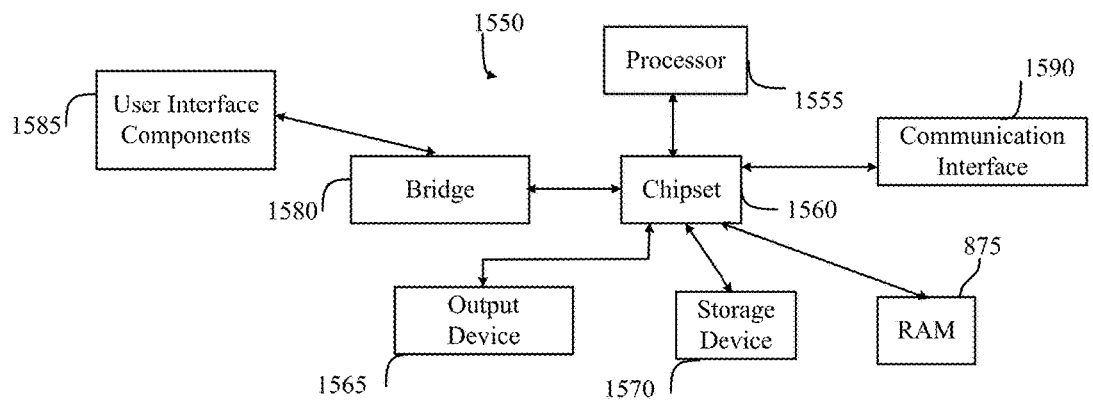
FIGS. 15A and 15B illustrate example possible system embodiments.
Figure 15A:
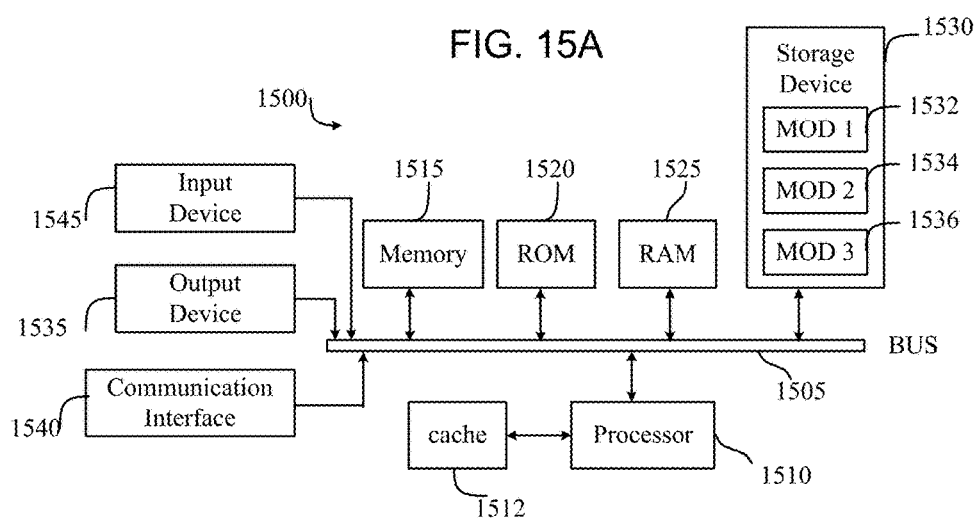

FIG. 15A and FIG. 15B illustrate example system embodiments. The more appropriate embodiment will be apparent to those of ordinary skill in the art when practicing the present technology. Persons of ordinary skill in the art will also readily appreciate that other system embodiments are possible.

FIG. 15A illustrates a conventional system bus computing system architecture 1500 wherein the components of the system are in electrical communication with each other using a bus 1505. Exemplary system 1500 includes a processing unit (CPU or processor) 1510 and a system bus 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware module or software module, such as module 1 1532, module 2 1534, and module 3 1536 stored in storage device 1530, configured to control the processor 1510 as well as a special-purpose processor where software instructions are incorporated into the actual processor design. The processor 1510 may essentially be a completely self-contained computing system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the computing device 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include software modules 1532, 1534, 1536 for controlling the processor 1510. Other hardware or software modules are contemplated. The storage device 1530 can be connected to the system bus 1505. In one aspect, a hardware module that performs a particular function can include the software component stored in a computer-readable medium in connection with the necessary hardware components, such as the processor 1510, bus 1505, display 1535, and so forth, to carry out the function.

FIG. 15B illustrates an example computer system 1550 having a chipset architecture that can be used in executing the described method and generating and displaying a graphical user interface (GUI). Computer system 1550 is an example of computer hardware, software, and firmware that can be used to implement the disclosed technology. System 1550 can include a processor 1555, representative of any number of physically and/or logically distinct resources capable of executing software, firmware, and hardware configured to perform identified computations. Processor 1555 can communicate with a chipset 1560 that can control input to and output from processor 1555. In this example, chipset 1560 outputs information to output device 1565, such as a display, and can read and write information to storage device 1570, which can include magnetic media, and solid state media, for example. Chipset 1560 can also read data from and write data to RAM 1575. A bridge 15150 for interfacing with a variety of user interface components 15155 can be provided for interfacing with chipset 1560. Such user interface components 15155 can include a keyboard, a microphone, touch detection and processing circuitry, a pointing device, such as a mouse, and so on. In general, inputs to system 1550 can come from any of a variety of sources, machine generated and/or human generated.

Chipset 1560 can also interface with one or more communication interfaces 1590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1555 analyzing data stored in storage 1570 or 1575. Further, the machine can receive inputs from a user via user interface components 15155 and execute appropriate functions, such as browsing functions by interpreting these inputs using processor 1555.

It can be appreciated that example systems 1500 and 1550 can have more than one processor 1510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method for joining a mobile computing device to a meeting event, the method comprising:
   emitting a sound signal from one or more speakers of a mobile computing device, the mobile computing device associated with a user profile;
   receiving a return sound signal at one or more microphones of the mobile computing device; and
   in response to determining the return sound signal corresponds to a transformation of the sound signal based on geometric characteristics of a docking station and when the mobile computing device is in a predetermined position relative to the docking station, causing a meeting application of the mobile computing device to configure a docking mode of the mobile computing device.

2. The method of claim 1, further comprising:
   connecting to a meeting calendar associated with the user profile;
   retrieving a desired meeting event; and
   joining the desired meeting event.

3. The method of claim 1, further comprising receiving a machine-readable code including docking station identifying information.

4. The method of claim 3, further comprising analyzing one or more of the user profile and the docking station identifying information in order to configure the docking mode of the mobile computing device.

5. The method of claim 1, wherein configuring the docking mode comprises one or more of adjusting a screen orientation, silencing notifications, and adjusting audio output settings for the mobile computing device.

6. The method of claim 1, further comprising causing the meeting application to configure the mobile computing device as a second screen device of a desired meeting event, wherein the second screen device displays supplementary meeting information and controls.

7. The method of claim 1, further comprising causing the meeting application to configure the mobile computing device as a primary screen device of a desired meeting event, wherein the primary screen device records and uploads audiovisual data to a meeting server.

8. The method of claim 2, wherein the desired meeting event is an ongoing or most proximate meeting event automatically determined from the meeting calendar.

9. The method of claim 2, wherein the desired meeting event is received as a user input to the meeting application.

10. A system, comprising:
    one or more processors;
    one or more speakers;
    one or more microphones; and
    one or more memory devices including a user profile and instructions that, when executed by the one or more processors, cause the system to:
      emit a sound signal from the one or more speakers;
      receive a return sound signal at the one or more microphones; and
      in response to a determination the return sound signal corresponds to a transformation of the sound signal based on geometric characteristics of a docking station and when the system is in a predetermined position relative to the docking station, cause a meeting application of the system to configure a docking mode of the system.

11. The system of claim 10, comprising additional instructions that, when executed by the one or more processors, further cause the system to:
    connect to a meeting calendar associated with the user profile;
    retrieve a desired meeting event; and
    join the desired meeting event.

12. The system of claim 10, instructions further cause the system to receive a machine-readable including docking station identifying information.

13. The system of claim 12, comprising additional instructions that, when executed by the one or more processors, further cause the system to analyze one or more of the user profile and the docking station identifying information in order to configure the docking mode of the system.

14. The system of claim 10, wherein operations to configure the docking mode comprise one or more of adjusting a screen orientation, silencing notifications, and adjusting audio output settings for the system.

15. The system of claim 10, comprising additional instructions that, when executed by the one or more processors, further cause the system to join a desired meeting event as a second screen device, wherein the second screen device displays supplementary meeting information and controls.

16. The system of claim 10, comprising additional instructions that, when executed by the one or more processors, further cause the system to join a desired meeting event as a primary screen device, wherein the primary screen device records and uploads audiovisual data to a meeting server.

17. The system of claim 11, wherein the desired meeting event is an ongoing or most proximate meeting event automatically determined from the meeting calendar.

18. The system of claim 11, wherein the desired meeting event is received as a user input to the meeting application.

19. The method of claim 1, wherein the sound signal comprises multiple frequencies.

20. The system of claim 10, wherein the sound signal comprises multiple frequencies.

* * * * *